United States Patent
Sharma et al.

(10) Patent No.: US 11,086,643 B1
(45) Date of Patent: Aug. 10, 2021

(54) SYSTEM AND METHOD FOR PROVIDING REQUEST DRIVEN, TRIGGER-BASED, MACHINE LEARNING ENRICHED CONTEXTUAL ACCESS AND MUTATION ON A DATA GRAPH OF CONNECTED NODES

(71) Applicant: Intuit Inc., Mountain View, CA (US)

(72) Inventors: Sahil Sharma, Bengaluru (IN); Divya Kumar, Bengaluru (IN); Rajshekhar Desai, Bengaluru (IN); Bhargava Narayana, Bangalore (IN); Arun Kumar A, Bengaluru (IN); Zeerak Mehdi, Bengaluru (IN)

(73) Assignee: Intuit Inc., Mountain View, CA (US)

( * ) Notice: Subject to any disclaimer, the term of this patent is extended or adjusted under 35 U.S.C. 154(b) by 372 days.

(21) Appl. No.: 16/203,131

(22) Filed: Nov. 28, 2018

(51) Int. Cl.
| | |
|---|---|
| H04L 29/06 | (2006.01) |
| G06F 9/451 | (2018.01) |
| G06N 20/20 | (2019.01) |
| G06F 11/34 | (2006.01) |
| G06N 3/08 | (2006.01) |
| G06F 17/18 | (2006.01) |
| G06F 21/31 | (2013.01) |
| G06F 21/62 | (2013.01) |
| G06Q 30/00 | (2012.01) |

(52) U.S. Cl.
CPC .......... *G06F 9/453* (2018.02); *G06F 11/3438* (2013.01); *G06F 17/18* (2013.01); *G06F 21/31* (2013.01); *G06F 21/6209* (2013.01); *G06N 3/088* (2013.01); *G06N 20/20* (2019.01); *G06Q 30/016* (2013.01)

(58) Field of Classification Search
CPC .. G06Q 40/123; G06Q 10/06; G06F 11/3438; G06F 21/62; G06F 21/6245; G06F 21/6227; H04L 67/306
See application file for complete search history.

(56) References Cited

U.S. PATENT DOCUMENTS

| | | | | |
|---|---|---|---|---|
| 9,412,103 | B1* | 8/2016 | d'Escragnolle | G06Q 30/016 |
| 10,162,734 | B1* | 12/2018 | Podgorny | H04L 67/02 |
| 10,460,398 | B1* | 10/2019 | Gielow | G06Q 40/123 |
| 2012/0216290 | A1* | 8/2012 | Roy | G06F 21/10 |
| | | | | 726/27 |
| 2015/0289152 | A1* | 10/2015 | Shanmugam | H04L 43/50 |
| | | | | 455/425 |

* cited by examiner

*Primary Examiner* — Jason K Gee
(74) *Attorney, Agent, or Firm* — Paradice and Li LLP

(57) ABSTRACT

A method and system monitors activity of a user of a data management system and detects a trigger event in the activity of the user. The method and system generates a support case responsive to the trigger event. The support case includes support rules defining what types of the user's personal data will be accessible to an assistance agent when the user requests assistance related to the trigger event. The method and system utilizes machine learning processes to determine what types of user related data should be accessible to assistance agents in support cases.

30 Claims, 4 Drawing Sheets

SYSTEM AND METHOD FOR PROVIDING REQUEST DRIVEN, TRIGGER-BASED, MACHINE LEARNING ENRICHED CONTEXTUAL ACCESS AND MUTATION ON A DATA GRAPH OF CONNECTED NODES

BACKGROUND

People utilize data management systems to assist in managing various types of data. For example, data management systems assist users to manage bookkeeping, tax return preparation, financial transactions, and budgeting. Data management systems enable users to electronically manage these matters in a way that reduces the amount of time and resources users spend managing their personal data.

Users of data management systems occasionally encounter problems or questions related to the use of the data management systems. Typically, users can resolve these problems by accessing self-help solutions provided by the data management systems. However, in some cases, users are not able to resolve their problems with the self-help solutions provided by the data management systems.

When other solutions fail, users of data management systems often attempt to contact assistance personnel of the data management systems. For example, users may make a telephone call to an assistance service of the data management systems in order to speak to a customer assistance agent, email a customer assistance agent, or enter into an instant message chat with a customer assistance agent. The customer assistance agent can then help resolve the problem or question of the user.

Conventional data management systems encounter many problems in providing customer assistance. For example, in many cases customer assistance agents must access some personal data of the user in order to assist the user. This typically results in the customer assistance agent being able to access all personal data of the user, regardless of the question or problem about which the user has contacted the customer assistance agent. Additionally, the customer assistance agent may have continued access to the user's personal data even after the question of the user has been resolved. In some conventional data management systems, other customer assistance agents may also be able to access the personal data of the user, even if those customer assistance agents are not directly assisting the user. All of these issues can represent a serious privacy and security concern for the user.

Users can suffer serious consequences if the lack of security results in malicious use of the user's personal data. If users of the data management systems suffer negative consequences, the data management systems themselves will also suffer negative consequences, such as a loss of trust from users, or even legal consequences.

Nevertheless, in many cases it is necessary that customer assistance agents have access to some of the personal data of the user in order to resolve the problem or question of the user. Traditional data management systems have been unable to find a technical solution that balances the privacy and security concerns of the users, while also enabling customer service agents to effectively help users resolve their questions and concerns.

What is needed is a method and system that provides a technical solution to the technical problem of providing efficient assistance to users of data management systems while adequately protecting the privacy and security of the users.

SUMMARY

Embodiments of the present disclosure provide one or more technical solutions to the technical problem of providing efficient assistance to users of data management systems while adequately protecting the privacy and security of the users. Embodiments of the present disclosure monitor the activity of a user as the user accesses services of the data management system. Embodiments of the present disclosure detect trigger events that indicate that a user is likely to access customer assistance. When the trigger event occurs, embodiments of the present disclosure generate a support case based on the type of trigger event and assign the support case to a selected customer assistance agent. The support case defines which portions of the user's data will be made available to the customer assistance agent. The support case also defines when, or under what circumstances, the customer assistance agent will no longer have access to the user's data. Thus, embodiments of the present disclosure dynamically and efficiently enable customer assistance agents to help resolve user concerns while providing protection to the personal data of the user.

In one embodiment, the support case enables the selected customer assistance agent to view user metadata indicating what types of data the data management system retains about the user but that are not currently available to be viewed by the customer assistance agent. If the customer assistance agent believes that he or she needs one or more of the unavailable data items in order to fully assist the user, the customer assistance agent can make a request to access to the one or more unavailable data items. A supervising agent can then grant access or deny access as the case may be.

In one embodiment, the data management system utilizes a machine learning model to continually refine and improve the efficiency and effectiveness of the user assistance system. For example, the machine learning model can identify which unavailable data items are commonly requested by customer assistance agents for the various types of support cases. The machine learning model receives data indicating whether such access requests were denied or granted. The machine learning model can then adjust the support case rules to automatically enable access to data items for which access requests are commonly granted for that particular type of support case and for that particular type of user. Thus, the data management system dynamically improves the efficiency of the customer support system by utilizing machine learning models.

Embodiments of the present disclosure overcome many of the drawbacks of traditional customer assistance processes and systems. Intelligently identifying when a user is likely to request assistance based on trigger events, generating a support case with rules that are based on the type of trigger event, and granting and restricting access to user personal data based on the rules utilizes significantly less human and computing resources in providing secure and efficient customer assistance to users. The result is a customer assistance process that is both efficient and secure in assisting users to resolve their questions and problems.

Figure 1:
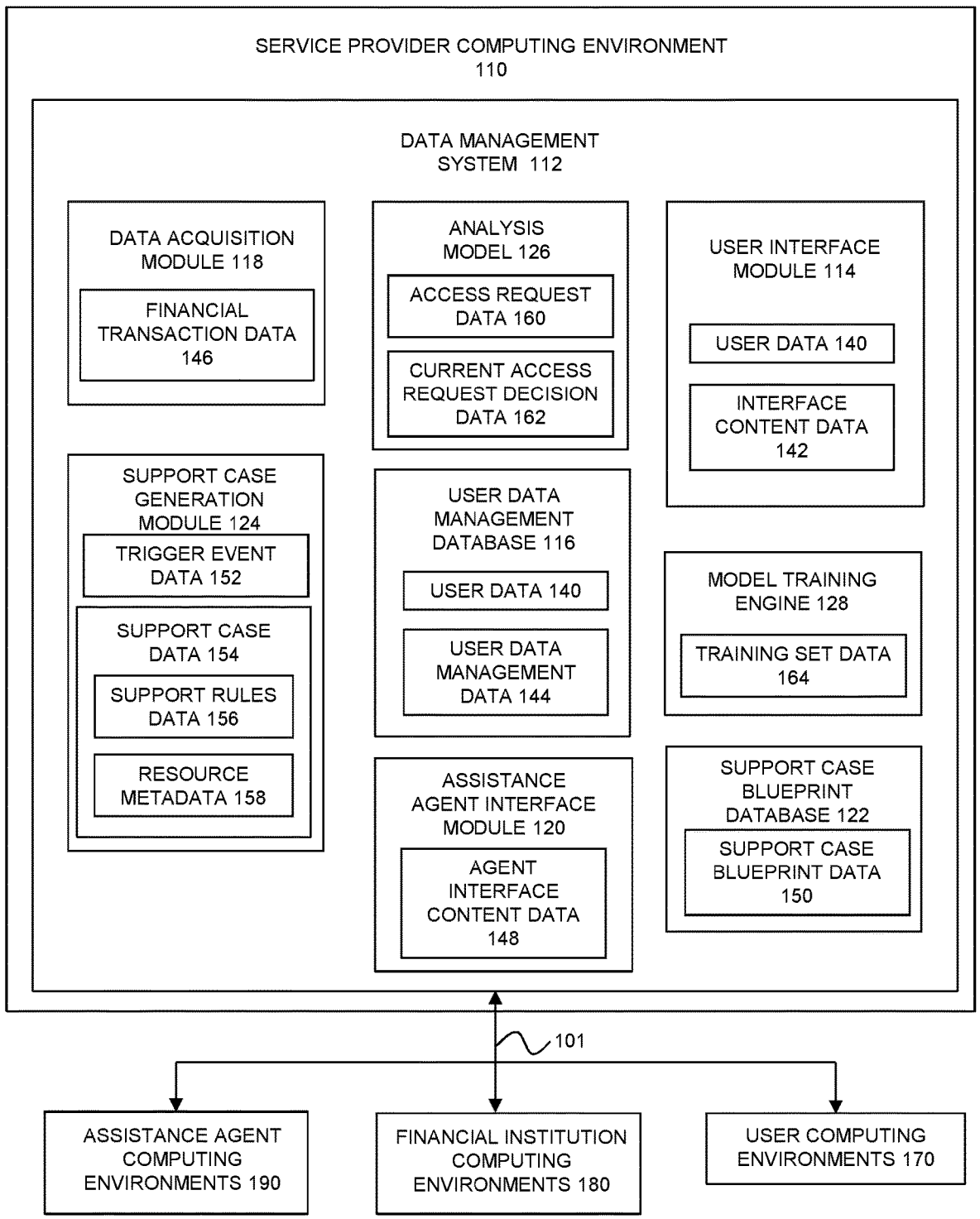
FIG. 1 is a block diagram of a system for efficiently and securely providing assistance to users of a data management system, in accordance with one embodiment.

Common reference numerals are used throughout the FIGs and the detailed description to indicate like elements. One skilled in the art will readily recognize that the above FIGs are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs, which depict one or more exemplary embodiments. Embodiments may be implemented in many different forms and should not be construed as limited to the embodiments set forth herein, shown in the FIGs, and described below. Rather, these exemplary embodiments are provided to allow a complete disclosure that conveys the principles of the invention, as set forth in the claims, to those of skill in the art.

FIG. 1 illustrates a block diagram of a production environment 100 for efficiently and securely providing assistance to users of a data management system, according to one embodiment. Embodiments of the present disclosure provide methods and systems for efficiently and securely providing assistance to users of a data management system, according to one embodiment. The data management system generates a trigger responsive to a trigger event occurring as a user uses the data management system. The trigger event is indicative that the user is likely to contact a user support service of the data management system 112. The data management system generates a support case based on the type of trigger event and assigns an assistance agent to the support case. The support case includes support rules defining the types of data related to the user that will be accessible by the assistance agent. The support rules also define the actions that the support agent will be able to perform on the account of the user. The support rules define a duration during which the assistance agent can access the data related to the user. In this way, before the user contacts the data management system for assistance, the data management system has already generated a support case structure that protects the sensitive information of the user while enabling an assistance agent to resolve the problems encountered by the user.

In one embodiment, the data management system utilizes machine learning processes to train an analysis model to determine whether the assistance agent should be granted access to additional requested items of the user related data. The assistance agent can make a request to be granted permission to access one or more additional data items related to the user. The analysis model analyzes the access request and all of the context related to the access request in order to determine whether the access request should be approved or denied. The context related to the access request can include an identity of the user, an identity of the agent, the type of trigger event, the timing of the request, and other contextual data related to the access request. Based on the contextual data of the access request, the analysis model determines whether or not access should be granted to the additional types of user related data. In this way, after the analysis model is trained, supervising agents no longer need to manually approve or deny many or all of the access requests, thereby conserving time and resources.

In one embodiment, the data management system further utilizes the analysis model to update and revise the support rules associated with the various trigger types. For example, if access requests for certain types of data are routinely approved for certain types of support cases, then the analysis model can update the blueprints of the support case to provide access to those types of data without the need of further access requests. This further reduces the need to manually revise support case blueprints.

The disclosed method and system for efficiently and securely providing assistance to users of a data management system provide for the processing and storing of smaller amounts of data, i.e., by enabling limiting the amount of data viewable by assistance agents, and by reducing the number of access request decisions that need to be made by supervising agents; thereby eliminating unnecessary data analysis and storage. Consequently, using the disclosed method and system for efficiently and securely providing assistance to users of a data management system results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for efficiently and securely providing assistance to users of a data management system.

The production environment 100 includes a service provider computing environment 110, user computing environments 170, financial institution computing environments 180, and assistance agent computing environments 190, for providing secure and effective support to users of a data management system, according to various embodiments. The computing environments 110, 170, 180, and 190 are communicatively coupled to each other with one or more communication channels 101, according to one embodiment.

The service provider computing environment 110 represents one or more computing systems such as a server or distribution center that is configured to receive, execute, and host one or more data management systems (e.g., applications) for access by one or more users, for providing secure and effective support to users of a data management system, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment.

The service provider computing environment 110 includes a data management system 112, which is configured to provide data management services to users.

According to one embodiment, the data management system 112 can be a system that manages one or more of book-keeping, accounting, banking, investments, loans, credit cards, real estate investments, retirement planning, bill pay, and budgeting. The data management system 112 can be a tax return preparation system or other type of data management system. The data management system 112 can be a standalone system that provides data management services to users. Alternatively, the data management system 112 can be integrated into other software or service products provided by a service provider.

As the data management system 112 provides data management services to users, it is possible that users will have questions or problems regarding use of the data management system 112. In these cases, it is possible that the users will feel the need to contact a user assistance system of the data management system 112 in order to answer the questions or resolve the problems. The data management system 112 provides a framework and system that enables assistance agents to provide effective assistance to the users while protecting sensitive data of the users.

The data management system 112 includes a user interface module 114, a user data management database 116, a data acquisition module 118, an assistance agent interface module 120, a support case blueprint database 122, a support case generation module 124, an analysis model 126, and a model training engine 128, according to various embodiments.

The user computing environments 170 correspond to computing environments of the various users of the data management system 112. The users of the data management system 112 utilize the user computing environments 170 to interact with the data management system 112. The users of the data management system 112 can use the user computing environments 170 to provide data to the data management system 112 and to receive data, including data management services, from the data management system 112.

In one embodiment, the data management system 112 can provide data management services to individuals, businesses, organizations, government entities, groups of individuals, or any other entities for which data management services would be beneficial, according to one embodiment. Individuals may utilize the data management system 112 to track their own revenues and expenditures. Businesses of all kinds, including large corporations, midsize companies, small businesses, or even sole proprietor businesses, can utilize the data management system 112 to track and sort their financial transactions as a way to better manage their finances. Likewise, government organizations may use the data management system 112 to track various types of expenditures and revenues. Organizations other than businesses and government entities, such as nonprofit organizations, may also utilize the data management system 112 for the purpose of monitoring and sorting expenditures and revenues. Thus, the term "user" can refer to many types of entities.

Returning to the data management system 112, the user interface module 114 is configured to receive user data 140 from the users, according to one embodiment. The user data 140 can include, for each user, information, such as, but not limited to, a first name of the user, a surname of the user, a date of birth of the user, a data management system user identification, a government identification number such as a driver's license number or a Social Security number, a date of birth of the user, a phone number of the user, demographics data associated with the user, a type of account that the user has with the data management system, an address of the user, authentication data that enables the user to access the data management system 112, data related to bank accounts of the user, credit card accounts of the user, loan accounts of the user, investments of the user, or other types of data that a user may provide in working with the data management system 112, according to various embodiments.

In one embodiment, the user data 140 can include account data corresponding to financial institution authentication data that enables the data management system 112 to access the financial accounts that the user has with third-party financial institutions or other third-parties. In one embodiment, the financial institution authentication data provided by the users as part of the user data 140 enables the data management system 112 to acquire information related to financial transactions of the users. The financial institution authentication data can include data that allows the data management system 112 to gain access to credit card data, bank account data, retirement fund data, payroll data, income data, loan data, interest accrual data, student loan data, property ownership data, tax data, budgeting data, rent data, investments data, employment data, or other types of data regarding financial transactions or financial accounts of the users. Thus, the financial institution authentication data can include login credentials and personal identification data for various websites of third-party financial institutions. The financial institution authentication data can include usernames, passwords, bank account numbers, routing numbers, credit card numbers, answers to security questions, identification numbers, government identification numbers, birth dates, addresses, or other types of verification credentials that allow the data management system 112 to gain access to online services of third-party financial service institutions.

According to an embodiment, the user interface module 114 provides interface content data 142 to assist the user in managing the user's data. The interface content data 142 can include navigation menus and other graphical user interface (GUI) tools that enable the user to navigate the data management system 112 in order to receive data management services. The interface content data 142 can include financial management data related to the financial transactions of the user. Thus, the user interface module 114 enables the data management system 112 to provide financial management services to the user.

In one embodiment, the data management system 112 includes a user data management database 116. The user data management database 116 includes the user data management data 144. The user data management data 144 can include data management data for all of the users of the data management system. Thus, the user data management database 116 can include a vast amount of data related to the data management services provided to users. In one embodiment, when the user utilizes the user interface module 114 to view interface content data 142, the interface content data 142 includes user data management data 144 related to the user as retrieved from the user data management database 116.

In one embodiment, the user data management data 144 includes financial management data of the users. The financial management data can include data related to the financial transactions of the users. The user data management data 144 can include, for each user, a list of financial transactions, summaries of various financial accounts, and other tools to assist the user in managing the user's finances. The user data management data 144 can include financial reports received, retrieved, or generated by the data management system 112

In one embodiment, the data management system 112 provides data management services other than financial management services. Accordingly, the user data management data 144 can include data other than financial management data.

In one embodiment, the data management system 112 utilizes the data acquisition module 118 to retrieve financial transaction data 146 related to the financial transactions of the users of the data management system 112. The data acquisition module 118 is configured to use the financial institution authentication data provided with the user data 140 to acquire financial transaction data 146 related to financial transactions of the users. In particular, the data acquisition module 118 uses the financial institution authentication data received with the user data 140 to log into the online services of third-party financial institutions in order to retrieve financial transaction data 146 related to the financial transactions of users of the data management system 112. For example, the financial transaction data 146 can include debit card transactions, credit card transactions, credit card balances, bank account deposits, bank account withdrawals, credit card payment transactions, online payment service transactions such as PayPal transactions or other online payment service transactions, loan payment transactions, investment account transactions, retirement account transactions, mortgage payment transactions, rent payment transactions, bill pay transactions, budgeting information, financial goal information, or any other types of financial transactions. The data acquisition module 118 is configured to gather the financial transaction data from financial institution computing environments 180 related to financial service institutions with which one or more users of the data management system 112 have a relationship. The financial transaction data 146 can include, for each financial transaction, time stamp data corresponding to a time stamp that indicates the date and time of the financial transaction.

In one example, the data acquisition module 118 uses the financial institution authentication data received with the user data 140 to acquire data related to withdrawals, deposits, and balances in the bank accounts of users. The financial transaction data 146 includes data related to these withdrawals, deposits, and balances. Accordingly, the financial institution authentication data can include usernames, passwords, bank account numbers, routing numbers, or other validation credentials needed to access online services of various banking institutions.

In one embodiment, the data management system 112 utilizes the data acquired by the data acquisition module 118 to assist users in managing their finances. For example, the data management system 112 can utilize the data acquired by the data acquisition module 118 to generate reports and summaries of the users' financial data or other types of data to assist the user and easily viewing and ascertaining the history and current status of the users' financial data or other kinds of data.

In some cases, users of the data management system 112 may require assistance in resolving a question, concern, or problem related to the services provided by the data management system 112. Accordingly, the data management system 112 retains user assistance agents to help resolve the questions or concerns of the users. In one embodiment, the assistance agents can include customer support personnel that receive phone calls, instant messages, or other communications from users of the data management system 112 and assist the users to resolve their questions or problems.

In one embodiment, the data management system 112 utilizes the assistance agent interface module 120 to enable assistance agents to provide support to users of the data management system 112. When the data management system 112 assigns an assistance agent to assist a user, the assistance agent can interface with the assistance agent interface module 120. When the assistance agent interfaces with the assistance agent interface module 120, the assistance agent interface module 120 provides agent interface content data 148 to the assistance agent. The assistance agent utilizes the agent interface content data 148 to assist the user to resolve the question or problem of the user. As will be set forth in more detail below, the data management system 112 provides a framework within which assistance agents can provide assistance to the users while enhancing the security of private data of the users.

In one embodiment, the assistance agent computing environments 190 correspond to computing environments utilized by assistance agents to interface with the data management system 112 and/or to communicate with the user computing environments 170. The assistance agent computing environments 190 include computing resources utilized by the assistance agents to access the data management system 112 in order to provide assistance to the users. The computing resources can include processing resources, memory resources, communication resources, and computing devices by which the assistance agents interface with the assistance agent interface module 120.

In one embodiment, the assistance agent computing environments 190 are part of the data management system 112. In this case, the computing resources and devices utilized by the assistance agents can include computing devices and applications owned, controlled, or otherwise operated by the data management system 112.

In one embodiment, the data management system 112 includes the support case blueprint database 122. The support case blueprint database 122 includes support case blueprint data 150. The support case blueprint data 150 includes a plurality of blueprints or frameworks for support cases.

In one embodiment, a support case blueprint corresponds to a particular type of support case based on a particular type of triggering event. A support case corresponds to an instance in which a user contacts the data management system 112 for assistance with a particular problem. There are several common types of problems for which users contact the data management system 112 for support. Accordingly, the support case blueprint data 150 includes a blueprint for each known type of support case.

In one embodiment, each support case blueprint defines a set of support rules that dictate the types of user data 140 that will be available to an assistance agent assigned to the support case. The user data 140 can include many types of sensitive data related to the user, including a first name of the user, a surname of the user, a date of birth of the user, a phone number of the user, a data management system user identification, a government identification number such as a driver's license number or a Social Security number, a date of birth of the user, demographics data associated with the user, a type of account that the user has with the data management system, an address of the user, authentication data that enables the user to access the data management system, data related to bank accounts of the user, credit card accounts of the user, loan accounts of the user, investments of the user, or other types of data that a user may provide in working with the data management system 112. Depending on the type of problem or question for which the user is requesting assistance, an assistance agent may need to access certain types of user data in order to help the user resolve the problem. However, there are many types of sensitive user data to which the assistance agent will not need access in order to resolve a particular problem or question of the user. Accordingly, in one embodiment, each support case blueprint defines which types of user data the assistance agent will be able to view, and which types of user data the assistance agent will not be able to view for a particular type of support case.

In one embodiment, each support case blueprint defines a set of operations that the assistance agent is authorized to perform relative to the support case. The operations can include changes or actions that the agent will be authorized to make relative to a user's account. For example, the operations can include whether an assistance agent will be authorized to change a user's login credentials, to generate a report for the user, to unlock an account of the user, etc. Restricting the types of user data that the assistance agent is able to view for a particular type of support case provides additional security to users of the data management system 112. Sensitive data that is not pertinent to that type of support case cannot be viewed by the assistance agent, thereby protecting the sensitive data of the user.

In one embodiment, one of the support case blueprints corresponds to a user account lockout, in which a user of the data management system 112 is locked out of his or her account. A user may be locked out of an account if the user provides incorrect login credentials a selected number of times. The support case rules for such instances may define that an assistance agent is able to view selected portions of the user data 140 including a user's first name, a date of birth, and a government identification number of the user. The support case rules may define that the assistance agent is not able to see a last name of the user, bank account information of the user, a location of the user, and other types of information not pertinent to assisting a user to unlock the user's account. The support case rules may define that the operations that the assistance agent is able to perform in relation to the support case are limited to unlocking an account of the user. The assistance agent will not be authorized to generate a financial report or reset a password for the user.

In one embodiment, one of the support case blueprints corresponds to a failure by the data management system 112 to retrieve financial information for the user. In this case, the support case rules may define that the assistance agent is able to view bank account information of the user. The support case rules may also define that the assistance agent is able to adjust bank account information and to generate a financial report for the user. The support case rules may prohibit the assistance agent from unlocking an account or changing an account password.

In one embodiment, the data management system 112 utilizes the support case generation module 124 to generate support cases for users of the data management system 112. When a particular user encounters a particular type of problem, the support case generation module 124 accesses from the support case blueprint database 122, a support case blueprint corresponding to that type of problem encountered by the user. The support case generation module 124 generates a support case for the user based on the selected support case blueprint.

In one embodiment, the support case generation module 124 generates support cases in response to trigger events. The support case generation module 124 includes trigger event data 152. The trigger event data 152 identifies a list of trigger events, each of which can trigger the creation of a support case. The trigger events can include particular actions taken by a user, actions taken by the data management system 112 in response to actions taken by the user, failures by the data management system 112 to complete an operation or process for a user, or other types of events that are predictive of users requesting support from the data management system 112.

In one embodiment, one of the trigger events is an account lockout in which a user has been locked out of the user's account. For example, if the user incorrectly enters account login credentials several times, the data management system 112 may lock the user out of the user's account. When a user is locked out of the user's account, the support case generation module 124 recognizes this as a trigger event. The support case generation module 124 generates support case data 154 responsive to the account lockout. The support case generation module 124 generates the support case data 154 based on an account lockout support case blueprint from the support case blueprint database 122. The support case data 154 includes support rules data 156 defining the types of information from the user data 140 that may be viewed by the assistance agent. The support rules data 156 also defines the operations that the assistance agent is permitted to undertake in resolving the account lockout support case.

In one embodiment, when the support case generation module 124 generates the support case, the support case generation module 124 assigns an assistance agent to the support case. Thus, when the user contacts the data management system 112, the data management system 112 has already assigned an assistance agent to the support case for the user.

In one embodiment, the support case generation module 124 automatically generates support cases based on the trigger events, even before the user has requested assistance from the data management system 112. Thus, when a trigger event occurs, without any other action taken by the user, the support case generation module 124 generates the support case data 154 and assigns an assistance agent to the support case. When the user contacts the data management system 112 for assistance, the user is connected with the previously assigned assistance agent. The support case rules provide the tools needed by the assistance agent to help resolve the problem, while prohibiting the assistance agent from viewing other sensitive information or from taking actions not relevant to the support case.

In one embodiment, the support rules data 156 also defines a period of time or duration during which the assistance agent may view the defined portions of the user data 140 and take the defined actions for the support case. After the period of time has expired, or after other duration conditions are no longer valid, the assistance agent is no longer permitted to view the user data 140 or to take actions related to the support case. This helps protect the user's sensitive information by restricting access to the user data to a particular time period or duration.

In one embodiment, the support rules data 156 define that the assistance agent will no longer have access to the user data 140 after the support case has been resolved. For example, if the trigger event was an account lockout, resolution of the case corresponds to when the user is no longer locked out of the account. Once the user's account is unlocked, the case is considered resolved and the assistance agent no longer has access to the user data 140.

In one embodiment, the support rules data 156 define that the assistance agent will no longer have access to the user data 140 if the support case has not been resolved within a selected period of time. For example, if the support case is not resolved after a selected number of hours or minutes, the assistance agent will no longer have access to those selected portions of the user data 140. Thus, assistance agent will not have indefinite access to the user data 140 if a support case is not resolved quickly.

In one embodiment, the support case data 154 includes resource metadata 158. The resource metadata 158 defines the data that is known about the user. When an assistance agent accesses support case data 154 via the assistance agent interface module 120, the agent interface content data 148 includes the resource metadata 158. The assistance agent is able to view what types of information the data management system 112 knows, retains, or otherwise stores about the user. However, the assistance agent is only able to view the types of user data 140 defined by the support case rules data 156. Thus, the resource metadata 158 may indicate that various types of data are known about the user, while the support rules data 156 enables the assistance agent to access or view only a selected subset of the types of data that are known about the user.

In one example, the support case 154 is generated by a trigger event corresponding to a failure of the data management system 112 to retrieve financial transaction data related to a credit card of a user. When the assistance agent accesses the support case data 154, the assistance agent sees resource metadata 158 indicating that the data management system 112 stores data including the user's first name, the user's last name, the date of birth of the user, the Social Security number of the user, the driver's license number of the user, the street address of the user, the email address of the user, the phone number of the user, credit card information of the user, and bank account information of the user. However, in accordance with the support rules data 156 of the support case data 154, the assistance agent is only able view the first name of the user, the last name of the user, and the credit card information related to the credit card in question. This enables the assistance agent to help resolve the problem, without providing unnecessary access to additional sensitive information about the user.

In one embodiment, the data management system 112 enables an assistance agent to request access to additional types of information not initially accessible based on the support rules data 156. In some cases, an assistance agent may feel that access to one or more additional types of the user data 140 are necessary or helpful in resolving the problem or concern of the user. In this case, the assistance agent can select the particular type of data indicated in the resource metadata 158 and can request access to that particular type of user data 140.

In one embodiment, when an assistance agent requests access to an additional type of the user data 140, the data management system 112 forwards the request to a supervising agent. The supervising agent can then determine whether the assistance agent should be granted access to the additional information. If a supervising agent provides approval, then the assistance agent is granted access to the requested information. If the supervising agent does not provide approval, then the assistance agent is still unable to view the requested information.

In one embodiment, the data management system 112 utilizes the analysis model 126 to improve the process by which assistance agents request and receive permission to access additional types of the user data 140. In particular, the data management system 112 utilizes machine learning processes by which the analysis model 126 learns to identify the circumstances in which an assistance agent should be granted access to additional types of the user data 140.

In one embodiment, the data management system 112 retains historical access request decision data corresponding to decisions made by supervising agents in granting or denying access requests made by assistance agents. The historical access request decision data can include, for each access request decision, data indicating the type of support case in which the access request was made, the type or types of user data 140 for which access was requested, whether the access was granted, whether the assistance agent access the additional user data after access was granted, and other contextual information related to the access request. The analysis model 126 utilizes machine learning processes coupled with this historical access request decision data in order to learn when access should be granted to various types of user data 140 based on the historical access request decision data.

In one embodiment, after the analysis model 126 has been trained, or has otherwise learned to determine whether access should be granted to additional types of the user data 140, access requests made by assistance agents are provided directly to the analysis model 126. When the analysis model 126 receives access request data 160 corresponding to an access request made by an assistance agent, the analysis model 126 analyzes the access request data 160 in order to determine whether the access request should be approved or denied.

In one embodiment, the analysis model 126 generates current access request decision data 162 for each access request received by the analysis model 126. The current access request decision data 162 corresponds to a decision to approve or deny the access request. If the current access request decision data 162 indicates that the access request should be granted, then the assistance agent is granted access to the requested additional types of the user data 140.

In one embodiment, the analysis model 126 generates a context score for each access request. The context score determines how strongly the context of the access request indicates that access should be granted to the requested additional types of user data 140. The context of an access request includes the particular user, the particular assistance agent, a time of the request, a time of the trigger event, a type of trigger event, a type of the requested user data 140, and other contextual factors associated with the access request and the support case in general. The historical access request data also can include these contextual data for the historical access requests.

The context score can be generated for each individual type of requested user data 140. In one embodiment, if the context score is greater than a threshold context score, then the analysis model 126 may grant access to the requested type of user data 140. If the context score is less than a threshold context score, then the analysis model 126 may deny access to the requested type of user data 140.

In one embodiment, if the analysis model 126 denies an access request, then the analysis model 126 forwards the access request to a supervising agent. The supervising agent can then determine whether the access request should be granted or denied. The analysis model 126, in turn, learns from the decisions made by the supervising agents.

In one embodiment, the analysis model 126 can update the support case blueprint data 150 in the support case blueprint database 122. For example, if access requests for a particular type of user data 140 are routinely granted for particular type of support case, then the analysis model 126 can update the support case blueprint data 150 to enable access to that type of user data 140 going forward. In this way, the data management system 112 can utilize machine learning processes to continually update and improve the efficiency and effectiveness with which assistance agents are able to assist users. The data management system 112 achieves this by utilizing the analysis model 126 to intelligently update and revise support case blueprints based on decisions made in the past by one or both of the analysis model 126 and supervising agents.

In one embodiment, the resource metadata 158 defines multiple types of resource blueprints. For example, users of the data management system 112 may have a blueprint identifying the types of personal information retained about a user. The data management system 112 may have additional resource blueprints for financial information such as bank information and credit card information. Banking and credit card resource blueprints may be linked to user blueprints.

In one embodiment, a resource blueprint captures the resource definition. The resource definition can include the attributes and operations that are available on the resource. The resource definition can also capture the relations that might exist between the resource and other resources. For example, one resource may be a user, and another resource may be financial information related to the user.

In one embodiment, the resource blueprint, or resource metadata 158, can be defined by a graph query language type schema. In one embodiment, the resource blueprint, or resource metadata 158, can be defined by a file format that uses human readable text to transmit data objects consisting of attribute value pairs and array data types. The file format can include a JavaScript object notation (JSON) format, in one example.

In one embodiment, the data management system 112 provides one or more application programming interfaces (API) by which resource blueprints can be created, updated, or retrieved.

In one example, in accordance with one embodiment, a user of the data management system 112 is locked out of her account, which is an example trigger event corresponding to a user account lockout. A trigger handler, such as the support case generation module 124, generates a support case in the system and assigns an assistance agent to the support case. A context definition repository is queried to fetch the context definition matched to the current trigger type. Information such as the identity of the user, the identity of the assistance agent, the support case, and the context definition are passed on to a context builder and the access context is created. The user contacts, for example by telephone or instant message, an assistance service of the data management system 112. The assigned assistance agent clicks on the support case details for user verification. A request is made to the context repository and the entire user blueprint, with only the values of three attributes including Social Security number, date of birth, and mobile phone number of the user, and permissions to unlock the account are returned. The assistance agent can additionally request access to more user attributes. Based on the context score associated with those attributes, the access may be granted or denied. Machine learning algorithms can be used to calculate the current context score and can also be used to determine the default attributes and mutations which are available for the current context. Once the customer confirms her identity, the assistance agent performs the unlock account action for the user. Once the case is closed, the context is destroyed and the agent can no longer access the customer details.

In one embodiment, the data management system 112 generates training set data 164. The training set data 164 is generated from the access request decision data from supervising agents that have made access request decisions in the past. The training set data 164 can be utilized by the model training engine 128 to train the analysis model 126.

In one embodiment, the model training engine 128 trains the analysis model 126 with a supervised machine learning process. The machine learning processes is supervised because the training set data 164 includes labeled data against which the classification performed by the analysis model 126 can be checked. Alternatively, or additionally, the model training engine 128 can train the analysis model with an unsupervised machine learning process. Alternatively, or additionally, the model training engine 128 can train an analysis model with an unsupervised deep learning machine learning process. Alternatively, or additionally, the model training engine 128 can train the analysis model 126 with a combination of supervised, unsupervised, and deep learning machine learning processes.

In one embodiment, the analysis model includes one or more of a decision tree model, a random forest model, a logistic regression model, a latent Dirichlet allocation model, and a neural network model.

Embodiments of the present disclosure overcome many of the drawbacks of traditional customer assistance processes and systems. Intelligently identifying when a user is likely to request assistance based on trigger events, generating a support case with rules that are based on the type of trigger event, and granting and restricting access to user personal data based on the rules utilizes significantly less human and computing resources in providing secure and efficient customer assistance to users. The result is a customer assistance process that is both efficient and secure in assisting users to resolve their questions and problems.

Figure 2:
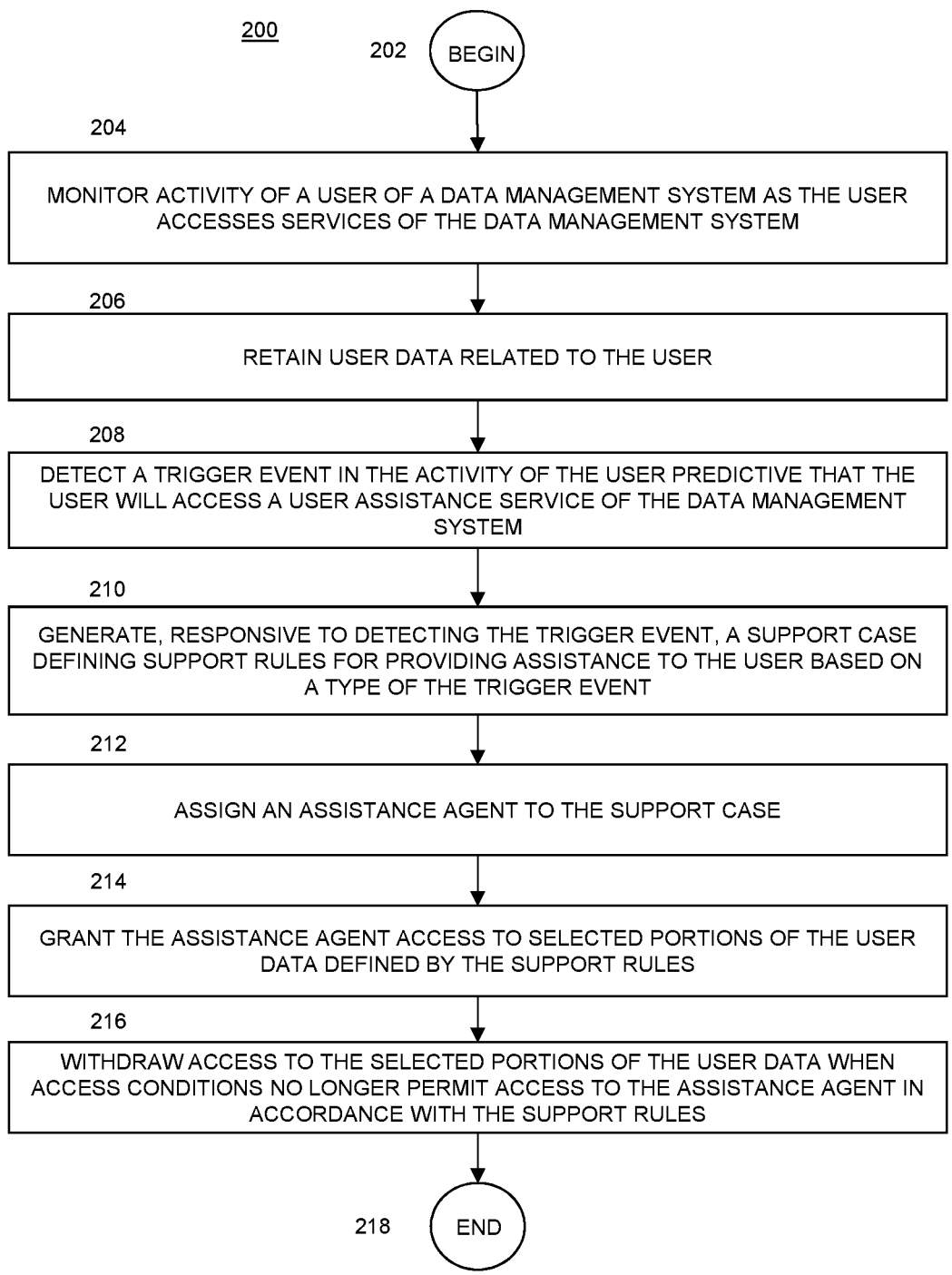
FIG. 2 is a flow diagram of a process for efficiently and securely providing assistance to users of a data management system, in accordance with one embodiment.

FIG. 2 illustrates a flow diagram of a process 200 for efficiently and securely providing assistance to users of a data management system, in various embodiments.

Referring to FIGS. 1-2, and the description of FIG. 1 above, in one embodiment, process 200 begins at BEGIN 202 and process flow proceeds to MONITOR ACTIVITY OF A USER OF A DATA MANAGEMENT SYSTEM AS THE USER ACCESSES SERVICES OF THE DATA MANAGEMENT SYSTEM 204.

In one embodiment, at MONITOR ACTIVITY OF A USER OF A DATA MANAGEMENT SYSTEM AS THE USER ACCESSES SERVICES OF THE DATA MANAGEMENT SYSTEM 204, activity of a user of a data management system is monitored as the user accesses services of the data management system, using any of the methods, processes, and procedures discussed above with respect to FIG. 1

In one embodiment, once activity of a user of a data management system is monitored as the user accesses services of the data management system at MONITOR ACTIVITY OF A USER OF A DATA MANAGEMENT SYSTEM AS THE USER ACCESSES SERVICES OF THE DATA MANAGEMENT SYSTEM 204 process flow proceeds to RETAIN USER DATA RELATED TO THE USER 206.

In one embodiment, at RETAIN USER DATA RELATED TO THE USER 206, data is retained related to the user, using any of the methods, processes, and procedures discussed above with respect to FIG. 1

In one embodiment, once data is retained related to the user at RETAIN USER DATA RELATED TO THE USER 206, process flow proceeds to DETECT A TRIGGER EVENT IN THE ACTIVITY OF THE USER PREDICTIVE THAT THE USER WILL ACCESS A USER ASSISTANCE SERVICE OF THE DATA MANAGEMENT SYSTEM 208.

In one embodiment, at DETECT A TRIGGER EVENT IN THE ACTIVITY OF THE USER PREDICTIVE THAT THE USER WILL ACCESS A USER ASSISTANCE SERVICE OF THE DATA MANAGEMENT SYSTEM 208, a trigger event is detected in the activity of the user predictive that the user will access a user assistance service of the data management system, using any of the methods, processes, and procedures discussed above with respect to FIG. 1

In one embodiment, once a trigger event is detected in the activity of the user predictive that the user will access a user assistance service of the data management system at DETECT A TRIGGER EVENT IN THE ACTIVITY OF THE USER PREDICTIVE THAT THE USER WILL ACCESS A USER ASSISTANCE SERVICE OF THE DATA MANAGEMENT SYSTEM 208, process flow proceeds to GENERATE, RESPONSIVE TO DETECTING THE TRIGGER EVENT, A SUPPORT CASE DEFINING SUPPORT RULES FOR PROVIDING ASSISTANCE TO THE USER BASED ON A TYPE OF THE TRIGGER EVENT 210.

In one embodiment, at GENERATE, RESPONSIVE TO DETECTING THE TRIGGER EVENT, A SUPPORT CASE DEFINING SUPPORT RULES FOR PROVIDING ASSISTANCE TO THE USER BASED ON A TYPE OF THE TRIGGER EVENT 210, a support case is generated, responsive to detecting the trigger event, defining support rules for providing assistance to the user based on a type of the trigger event, using any of the methods, processes, and procedures discussed above with respect to FIG. 1

In one embodiment, once a support case is generated, responsive to detecting the trigger event, defining support rules for providing assistance to the user based on a type of the trigger event at GENERATE, RESPONSIVE TO DETECTING THE TRIGGER EVENT, A SUPPORT CASE DEFINING SUPPORT RULES FOR PROVIDING ASSISTANCE TO THE USER BASED ON A TYPE OF THE TRIGGER EVENT 210, process flow proceeds to ASSIGN AN ASSISTANCE AGENT TO THE SUPPORT CASE 212.

In one embodiment, at ASSIGN AN ASSISTANCE AGENT TO THE SUPPORT CASE 212, an assistance agent is assigned to the support case, using any of the methods, processes, and procedures discussed above with respect to FIG. 1

In one embodiment, once an assistance agent is assigned to the support case, at ASSIGN AN ASSISTANCE AGENT TO THE SUPPORT CASE 212, process flow proceeds to GRANT THE ASSISTANCE AGENT ACCESS TO SELECTED PORTIONS OF THE USER DATA DEFINED BY THE SUPPORT RULES 214.

In one embodiment, at GRANT THE ASSISTANCE AGENT ACCESS TO SELECTED PORTIONS OF THE USER DATA DEFINED BY THE SUPPORT RULES 214, access is granted the assistance agent to selected portions of the user data defined by the support rules, using any of the methods, processes, and procedures discussed above with respect to FIG. 1

In one embodiment, once access is granted the assistance agent to selected portions of the user data defined by the support rules at GRANT THE ASSISTANCE AGENT ACCESS TO SELECTED PORTIONS OF THE USER DATA DEFINED BY THE SUPPORT RULES 214, process flow proceeds to WITHDRAW ACCESS TO THE SELECTED PORTIONS OF THE USER DATA WHEN ACCESS CONDITIONS NO LONGER PERMIT ACCESS TO THE ASSISTANCE AGENT IN ACCORDANCE WITH THE SUPPORT RULES 216.

In one embodiment, at WITHDRAW ACCESS TO THE SELECTED PORTIONS OF THE USER DATA WHEN ACCESS CONDITIONS NO LONGER PERMIT ACCESS TO THE ASSISTANCE AGENT IN ACCORDANCE WITH THE SUPPORT RULES, access to the selected portions of the user data is withdrawn when access conditions no longer permit access to the assistance agent in accordance with the support rules, using any of the methods, processes, and procedures discussed above with respect to FIG. 1

In one embodiment, once access to the selected portions of the user data is withdrawn when access conditions no longer permit access to the assistance agent in accordance with the support rules at WITHDRAW ACCESS TO THE SELECTED PORTIONS OF THE USER DATA WHEN ACCESS CONDITIONS NO LONGER PERMIT ACCESS TO THE ASSISTANCE AGENT IN ACCORDANCE WITH THE SUPPORT RULES 216, process flow proceeds to END 218.

In one embodiment, at END 218 the process 200 for efficiently and securely providing assistance to users of a data management system is exited to await new data and/or instructions.

Figure 3:
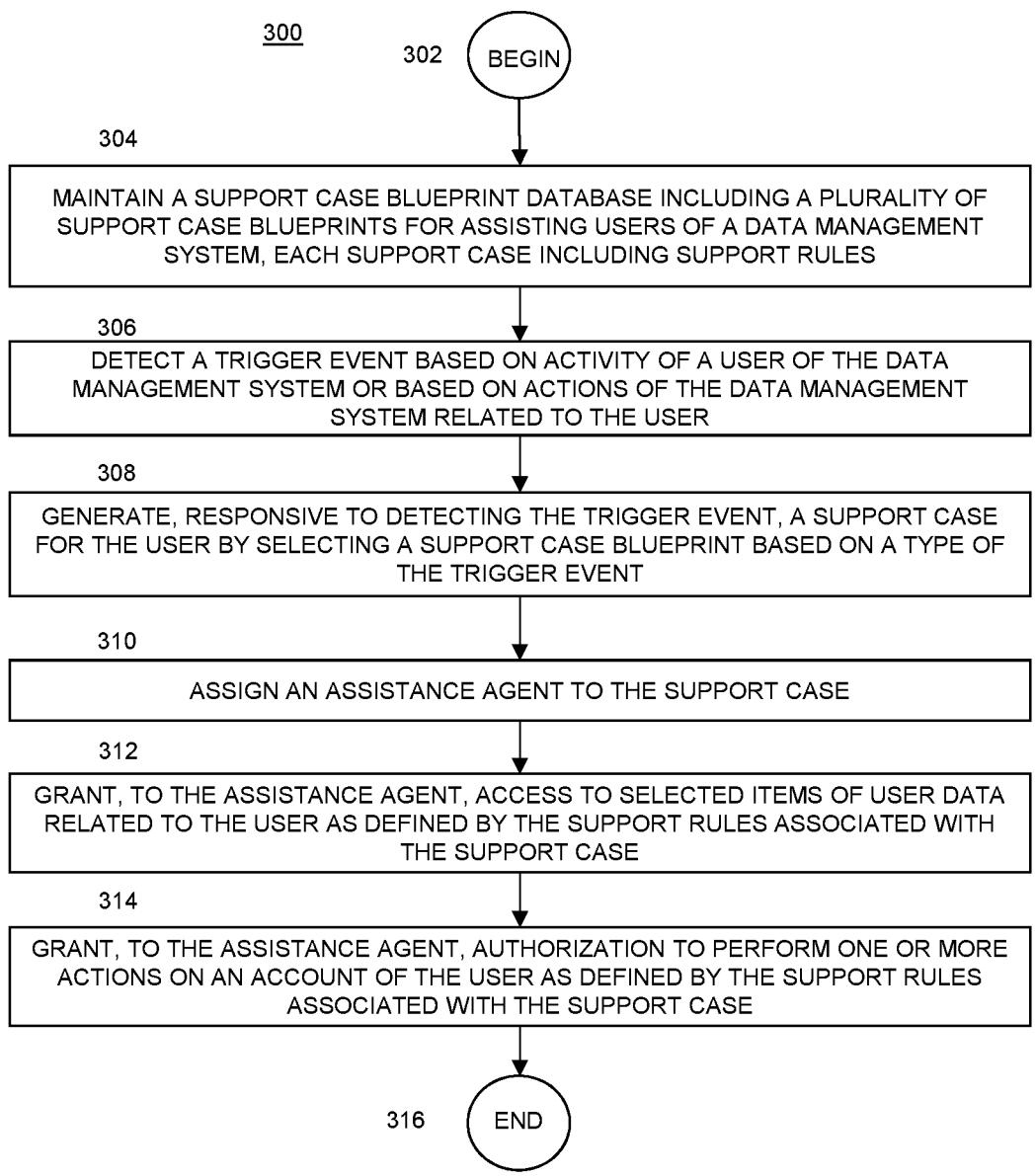
FIG. 3 is a flow diagram of a process for efficiently and securely providing assistance to users of a data management system, in accordance with one embodiment.

FIG. 3 illustrates a flow diagram of a process 300 for efficiently and securely providing assistance to users of a data management system, in various embodiments.

Referring to FIGS. 1 and 3, and the description of FIG. 1 above, in one embodiment, process 300 begins at BEGIN 302 and process flow proceeds to MAINTAIN A SUPPORT CASE BLUEPRINT DATABASE INCLUDING A PLURALITY OF SUPPORT CASE BLUEPRINTS FOR ASSISTING USERS OF A DATA MANAGEMENT SYSTEM, EACH SUPPORT CASE INCLUDING SUPPORT RULES 304.

In one embodiment, at MAINTAIN A SUPPORT CASE BLUEPRINT DATABASE INCLUDING A PLURALITY OF SUPPORT CASE BLUEPRINTS FOR ASSISTING USERS OF A DATA MANAGEMENT SYSTEM, EACH SUPPORT CASE INCLUDING SUPPORT RULES 304, a support case blueprint database is maintained including a plurality of support case blueprints for assisting users of a data management system, each support case including support rules, using any of the methods, processes, and procedures discussed above with respect to FIG. 1

In one embodiment, once a support case blueprint database is maintained including a plurality of support case blueprints for assisting users of a data management system, each support case including support rules at MAINTAIN A SUPPORT CASE BLUEPRINT DATABASE INCLUDING A PLURALITY OF SUPPORT CASE BLUEPRINTS FOR ASSISTING USERS OF A DATA MANAGEMENT SYSTEM, EACH SUPPORT CASE INCLUDING SUPPORT RULES 304 process flow proceeds to DETECT A TRIGGER EVENT BASED ON ACTIVITY OF A USER OF THE DATA MANAGEMENT SYSTEM OR BASED ON ACTIONS OF THE DATA MANAGEMENT SYSTEM RELATED TO THE USER 306.

In one embodiment, at DETECT A TRIGGER EVENT BASED ON ACTIVITY OF A USER OF THE DATA MANAGEMENT SYSTEM OR BASED ON ACTIONS OF THE DATA MANAGEMENT SYSTEM RELATED TO THE USER 306, a trigger event is detected based on activity of a user of the data management system or based on actions of the data management system related to the user, using any of the methods, processes, and procedures discussed above with respect to FIG. 1

In one embodiment, once a trigger event is detected based on activity of a user of the data management system or based on actions of the data management system related to the user at DETECT A TRIGGER EVENT BASED ON ACTIVITY OF A USER OF THE DATA MANAGEMENT SYSTEM OR BASED ON ACTIONS OF THE DATA MANAGEMENT SYSTEM RELATED TO THE USER 306, process flow proceeds to GENERATE, RESPONSIVE TO DETECTING THE TRIGGER EVENT, A SUPPORT CASE FOR THE USER BY SELECTING A SUPPORT CASE BLUEPRINT BASED ON A TYPE OF THE TRIGGER EVENT 308.

In one embodiment, at GENERATE, RESPONSIVE TO DETECTING THE TRIGGER EVENT, A SUPPORT CASE FOR THE USER BY SELECTING A SUPPORT CASE BLUEPRINT BASED ON A TYPE OF THE TRIGGER EVENT 308, a support case is generated, responsive to detecting the trigger event, for the user by selecting a support case blueprint based on a type of the trigger event, using any of the methods, processes, and procedures discussed above with respect to FIG. 1

In one embodiment, once a support case is generated, responsive to detecting the trigger event, for the user by selecting a support case blueprint based on a type of the trigger event at GENERATE, RESPONSIVE TO DETECTING THE TRIGGER EVENT, A SUPPORT CASE FOR THE USER BY SELECTING A SUPPORT CASE BLUEPRINT BASED ON A TYPE OF THE TRIGGER EVENT 308, process flow proceeds to ASSIGN AN ASSISTANCE AGENT TO THE SUPPORT CASE 310.

In one embodiment, at ASSIGN AN ASSISTANCE AGENT TO THE SUPPORT CASE 310, an assistance agent is assigned to the support case, using any of the methods, processes, and procedures discussed above with respect to FIG. 1

In one embodiment, once an assistance agent is assigned to the support case at ASSIGN AN ASSISTANCE AGENT TO THE SUPPORT CASE 310, process flow proceeds to GRANT, TO THE ASSISTANCE AGENT, ACCESS TO SELECTED ITEMS OF USER DATA RELATED TO THE USER AS DEFINED BY THE SUPPORT RULES ASSOCIATED WITH THE SUPPORT CASE 312.

In one embodiment, at GRANT, TO THE ASSISTANCE AGENT, ACCESS TO SELECTED ITEMS OF USER DATA RELATED TO THE USER AS DEFINED BY THE SUPPORT RULES ASSOCIATED WITH THE SUPPORT CASE, access to selected items of user data is granted, to the assistance agent, related to the user as defined by the support rules associated with the support case, using any of the methods, processes, and procedures discussed above with respect to FIG. 1

In one embodiment, once access to selected items of user data is granted, to the assistance agent, related to the user as defined by the support rules associated with the support case, at GRANT, TO THE ASSISTANCE AGENT, ACCESS TO SELECTED ITEMS OF USER DATA RELATED TO THE USER AS DEFINED BY THE SUPPORT RULES ASSOCIATED WITH THE SUPPORT CASE 312, process flow proceeds to GRANT, TO THE ASSISTANCE AGENT, AUTHORIZATION TO PERFORM ONE OR MORE ACTIONS ON AN ACCOUNT OF THE USER AS DEFINED BY THE SUPPORT RULES ASSOCIATED WITH THE SUPPORT CASE 314.

In one embodiment, at GRANT, TO THE ASSISTANCE AGENT, AUTHORIZATION TO PERFORM ONE OR MORE ACTIONS ON AN ACCOUNT OF THE USER AS DEFINED BY THE SUPPORT RULES ASSOCIATED WITH THE SUPPORT CASE 314, authorization is granted, to the assistance agent, to perform one or more actions on an account of the user as defined by the support rules associated with the support case, using any of the methods, processes, and procedures discussed above with respect to FIG. 1

In one embodiment, once authorization is granted, to the assistance agent, to perform one or more actions on an account of the user as defined by the support rules associated with the support case at GRANT, TO THE ASSISTANCE AGENT, AUTHORIZATION TO PERFORM ONE OR MORE ACTIONS ON AN ACCOUNT OF THE USER AS DEFINED BY THE SUPPORT RULES ASSOCIATED WITH THE SUPPORT CASE 314, process flow proceeds to END 316.

In one embodiment, at END 316 the process 300 for efficiently and securely providing assistance to users of a data management system is exited to await new data and/or instructions.

Figure 4:
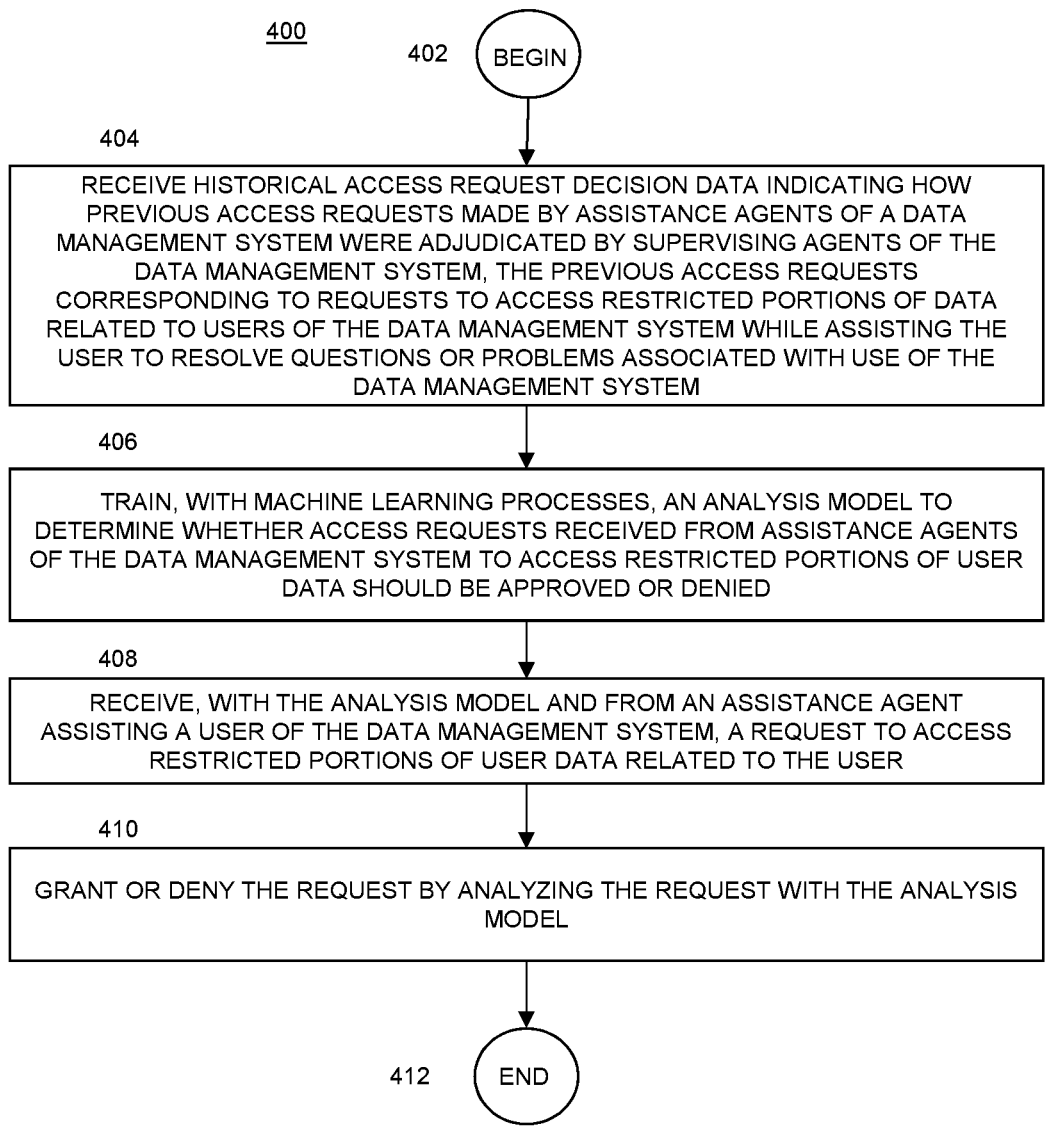
FIG. 4 is a flow diagram of a process for efficiently and securely providing assistance to users of a data management system, in accordance with one embodiment.

FIG. 4 illustrates a flow diagram of a process 400 for efficiently and securely providing assistance to users of a data management system, in various embodiments.

Referring to FIG. 4, FIGS. 1-2, and the description of FIGS. 1-2 above, in one embodiment, process 400 begins at BEGIN 402 and process flow proceeds to RECEIVE HISTORICAL ACCESS REQUEST DECISION DATA INDICATING HOW PREVIOUS ACCESS REQUESTS MADE BY ASSISTANCE AGENTS OF A DATA MANAGEMENT SYSTEM WERE ADJUDICATED BY SUPERVISING AGENTS OF THE DATA MANAGEMENT SYSTEM, THE PREVIOUS ACCESS REQUESTS CORRESPONDING TO REQUESTS TO ACCESS RESTRICTED PORTIONS OF DATA RELATED TO USERS OF THE DATA MANAGEMENT SYSTEM WHILE ASSISTING THE USER TO RESOLVE QUESTIONS OR PROBLEMS ASSOCIATED WITH USE OF THE DATA MANAGEMENT SYSTEM 404.

In one embodiment, at RECEIVE HISTORICAL ACCESS REQUEST DECISION DATA INDICATING HOW PREVIOUS ACCESS REQUESTS MADE BY ASSISTANCE AGENTS OF A DATA MANAGEMENT SYSTEM WERE ADJUDICATED BY SUPERVISING AGENTS OF THE DATA MANAGEMENT SYSTEM, THE PREVIOUS ACCESS REQUESTS CORRESPONDING TO REQUESTS TO ACCESS RESTRICTED PORTIONS OF DATA RELATED TO USERS OF THE DATA MANAGEMENT SYSTEM WHILE ASSISTING THE USER TO RESOLVE QUESTIONS OR PROBLEMS ASSOCIATED WITH USE OF THE DATA MANAGEMENT SYSTEM 404, historical access request decision data is received indicating how previous access requests made by assistance agents of a data management system were adjudicated by supervising agents of the data management system, the previous access requests corresponding to requests to access restricted portions of data related to users of the data management system while assisting the user to resolve questions or problems associated with use of the data management system, using any of the methods, processes, and procedures discussed above with respect to FIG. 1

In one embodiment, once historical access request decision data is received indicating how previous access requests made by assistance agents of a data management system were adjudicated by supervising agents of the data management system, the previous access requests corresponding to requests to access restricted portions of data related to users of the data management system while assisting the user to resolve questions or problems associated with use of the data management system at RECEIVE HISTORICAL ACCESS REQUEST DECISION DATA INDICATING HOW PREVIOUS ACCESS REQUESTS MADE BY ASSISTANCE AGENTS OF A DATA MANAGEMENT SYSTEM WERE ADJUDICATED BY SUPERVISING AGENTS OF THE DATA MANAGEMENT SYSTEM, THE PREVIOUS ACCESS REQUESTS CORRESPONDING TO REQUESTS TO ACCESS RESTRICTED PORTIONS OF DATA RELATED TO USERS OF THE DATA MANAGEMENT SYSTEM WHILE ASSISTING THE USER TO RESOLVE QUESTIONS OR PROBLEMS ASSOCIATED WITH USE OF THE DATA MANAGEMENT SYSTEM 404 process flow proceeds to TRAIN, WITH MACHINE LEARNING PROCESSES, AN ANALYSIS MODEL TO DETERMINE WHETHER ACCESS REQUESTS RECEIVED FROM ASSISTANCE AGENTS OF THE DATA MANAGEMENT SYSTEM TO ACCESS RESTRICTED PORTIONS OF USER DATA SHOULD BE APPROVED OR DENIED 406.

In one embodiment, at TRAIN, WITH MACHINE LEARNING PROCESSES, AN ANALYSIS MODEL TO DETERMINE WHETHER ACCESS REQUESTS RECEIVED FROM ASSISTANCE AGENTS OF THE DATA MANAGEMENT SYSTEM TO ACCESS RESTRICTED PORTIONS OF USER DATA SHOULD BE APPROVED OR DENIED 406, an analysis model is trained, with machine learning processes, to determine whether access requests received from assistance agents of the data management system to access restricted portions of user data should be approved or denied, using any of the methods, processes, and procedures discussed above with respect to FIG. 1.

In one embodiment, once an analysis model is trained, with machine learning processes, to determine whether access requests received from assistance agents of the data management system to access restricted portions of user data should be approved or denied at TRAIN, WITH MACHINE LEARNING PROCESSES, AN ANALYSIS MODEL TO DETERMINE WHETHER ACCESS REQUESTS RECEIVED FROM ASSISTANCE AGENTS OF THE DATA MANAGEMENT SYSTEM TO ACCESS RESTRICTED PORTIONS OF USER DATA SHOULD BE APPROVED OR DENIED 406, process flow proceeds to RECEIVE, WITH THE ANALYSIS MODEL AND FROM AN ASSISTANCE AGENT ASSISTING A USER OF THE DATA MANAGEMENT SYSTEM, A REQUEST TO ACCESS RESTRICTED PORTIONS OF USER DATA RELATED TO THE USER 408.

In one embodiment, at RECEIVE, WITH THE ANALYSIS MODEL AND FROM AN ASSISTANCE AGENT ASSISTING A USER OF THE DATA MANAGEMENT SYSTEM, A REQUEST TO ACCESS RESTRICTED PORTIONS OF USER DATA RELATED TO THE USER 408, a request to access restricted portions of user data related to the user is received with the analysis model and from an assistance agent assisting a user of the data management system, using any of the methods, processes, and procedures discussed above with respect to FIG. 1

In one embodiment, once a request to access restricted portions of user data related to the user is received with the analysis model and from an assistance agent assisting a user of the data management system at RECEIVE, WITH THE ANALYSIS MODEL AND FROM AN ASSISTANCE AGENT ASSISTING A USER OF THE DATA MANAGEMENT SYSTEM, A REQUEST TO ACCESS RESTRICTED PORTIONS OF USER DATA RELATED TO THE USER 408, process flow proceeds to GRANT OR DENY THE REQUEST BY ANALYZING THE REQUEST WITH THE ANALYSIS MODEL 410.

In one embodiment, at GRANT OR DENY THE REQUEST BY ANALYZING THE REQUEST WITH THE ANALYSIS MODEL 410, the request is granted or denied by analyzing the request with the analysis model, using any of the methods, processes, and procedures discussed above with respect to FIG. 1

In one embodiment, once the request is granted or denied by analyzing the request with the analysis model, at GRANT OR DENY THE REQUEST BY ANALYZING THE REQUEST WITH THE ANALYSIS MODEL 410, process flow proceeds to END 412.

In one embodiment, at END 412 the process 400 for efficiently and securely providing assistance to users of a data management system is exited to await new data and/or instructions.

As noted, the specific illustrative examples discussed above are but illustrative examples of implementations of embodiments of the method or process for efficiently and securely providing assistance to users of a data management system. Those of skill in the art will readily recognize that other implementations and embodiments are possible. Therefore, the discussion above should not be construed as a limitation on the claims provided below.

One embodiment is a method for efficiently and securely providing assistance to users of a data management system. The method includes monitoring activity of a user of a data management system as the user accesses services of the data management system, retaining user data related to the user, and detecting a trigger event in the activity of the user predictive that the user will access a user assistance service of the data management system. The method includes generating, responsive to detecting the trigger event, a support case defining support rules for providing assistance to the user based on a type of the trigger event, assigning an assistance agent to the support case, granting the assistance agent access to selected portions of the user data defined by the support rules, and withdrawing access to the selected portions of the user data when access conditions no longer permit access to the assistance agent in accordance with the support rules.

In one embodiment, a system for efficiently and securely providing assistance to users of a data management system includes at least one processor and at least one memory coupled to the at least one processor. The at least one memory having stored therein instructions which, when executed by any set of the one or more processors, perform a process. The process includes monitoring activity of a user of a data management system as the user accesses services of the data management system, retaining user data related to the user, and detecting a trigger event in the activity of the user predictive that the user will access a user assistance service of the data management system. The process includes generating, responsive to detecting the trigger event, a support case defining support rules for providing assistance to the user based on a type of the trigger event, assigning an assistance agent to the support case, granting the assistance agent access to selected portions of the user data defined by the support rules, and withdrawing access to the selected portions of the user data when access conditions no longer permit access to the assistance agent in accordance with the support rules.

One embodiment is a method for efficiently and securely providing assistance to users of a data management system. The method includes maintaining a support case blueprint database including a plurality of support case blueprints for assisting users of a data management system, each support case including support rules. The method includes detecting a trigger event based on activity of a user of the data management system or based on actions of the data management system related to the user, generating, responsive to detecting the trigger event, a support case for the user by selecting a support case blueprint based on a type of the trigger event, and assigning an assistance agent to the support case. The method includes granting, to the assistance agent, access to selected items of user data related to the user as defined by the support rules associated with the support case and granting to the assistance agent, authorization to perform one or more actions on an account of the user as defined by the support rules associated with the support case.

In one embodiment, a system for efficiently and securely providing assistance to users of a data management system includes at least one processor and at least one memory coupled to the at least one processor. The at least one memory having stored therein instructions which, when executed by any set of the one or more processors, perform a process. The process includes maintaining a support case blueprint database including a plurality of support case blueprints for assisting users of a data management system, each support case including support rules. The process includes detecting a trigger event based on activity of a user of the data management system or based on actions of the data management system related to the user, generating, responsive to detecting the trigger event, a support case for the user by selecting a support case blueprint based on a type of the trigger event, and assigning an assistance agent to the support case. The process includes granting, to the assistance agent, access to selected items of user data related to the user as defined by the support rules associated with the support case and granting to the assistance agent, authorization to perform one or more actions on an account of the user as defined by the support rules associated with the support case.

One embodiment is a method for efficiently and securely providing assistance to users of a data management system. The method includes receiving historical access request decision data indicating how previous access requests made by assistance agents of a data management system were adjudicated by supervising agents of the data management system. The previous access requests correspond to requests to access restricted portions of data related to users of the data management system while assisting the user to resolve questions or problems associated with use of the data management system. The method includes training, with machine learning processes, an analysis model to determine whether access requests received from assistance agents of the data management system to access restricted portions of user data should be approved or denied. The method includes receiving, with the analysis model and from an assistance agent assisting a user of the data management system, a request to access restricted portions of user data related to the user and granting or denying the request by analyzing the request with the analysis model.

In one embodiment, a system for efficiently and securely providing assistance to users of a data management system includes at least one processor and at least one memory coupled to the at least one processor. The at least one memory having stored therein instructions which, when executed by any set of the one or more processors, perform a process. The process includes receiving historical access request decision data indicating how previous access requests made by assistance agents of a data management system were adjudicated by supervising agents of the data management system. The previous access requests correspond to requests to access restricted portions of data related to users of the data management system while assisting the user to resolve questions or problems associated with use of the data management system. The process includes training, with machine learning processes, an analysis model to determine whether access requests received from assistance agents of the data management system to access restricted portions of user data should be approved or denied. The process includes receiving, with the analysis model and from an assistance agent assisting a user of the data management system, a request to access restricted portions of user data related to the user and granting or denying the request by analyzing the request with the analysis model.

Herein, the term "production environment" includes the various components, or assets, used to deploy, implement, access, and use, a given application as that application is intended to be used. In various embodiments, production environments include multiple assets that are combined, communicatively coupled, virtually connected, physically connected, or otherwise associated with one another, to provide the production environment implementing the application.

As specific illustrative examples, the assets making up a given production environment can include, but are not limited to, one or more computing environments used to implement the application in the production environment such as one or more of a data center, a cloud computing environment, a dedicated hosting environment, and other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control one or more assets or components of the production environment; one or more communications channels for sending and receiving data used to implement the application in the production environment; one or more access control systems for limiting access to various components of the production environment, such as firewalls and gateways; one or more traffic or routing systems used to direct, control, or buffer, data traffic to components of the production environment, such as routers and switches; one or more communications endpoint proxy systems used to buffer, process, or direct data traffic, such as load balancers or buffers; one or more secure communication protocols or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; or any other assets/components making up an actual production environment in which an application is deployed, implemented, accessed, and run, e.g., operated, as discussed herein, or as known in the art at the time of filing, or as developed after the time of filing.

As used herein, the term "historical user data" refers to data that has been stripped of all data, such as Personal Identification Data (PID), that could identify any individual. Accordingly, the historical user data is data that has been sanitized by removing any data that could be used to identify any individual user, directly or indirectly, or that could be used to access a historical user's data or accounts, or otherwise reveal personal information about a specific individual. Furthermore, historical user data is used only for testing document preparation systems, such as testing tax return preparation systems.

As used herein, the terms "computing system", "computing device", and "computing entity", include, but are not limited to, a virtual asset; a server computing system; a workstation; a desktop computing system; a mobile computing system, including, but not limited to, smart phones, portable devices, or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes or operations as described herein.

As used herein, the term "computing environment" includes, but is not limited to, a logical or physical grouping of connected or networked computing systems or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems or virtual assets making up the trusted computing environment, are either under the control of, or known to, a party.

In various embodiments, each computing environment includes allocated assets and virtual assets associated with, and controlled or used to create, deploy, or operate an application.

In various embodiments, one or more cloud computing environments are used to create, deploy, or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, or as known in the art at the time of filing, or as developed after the time of filing.

In many cases, a given application or service may utilize, and interface with, multiple cloud computing environments, such as multiple VPCs, in the course of being created, deployed, or operated.

As used herein, the term "virtual asset" includes any virtualized entity or resource or virtualized part of an actual "bare metal" entity. In various embodiments, the virtual assets can be, but are not limited to, virtual machines, virtual servers, and instances implemented in a cloud computing environment; databases associated with a cloud computing environment, or implemented in a cloud computing environment; services associated with, or delivered through, a cloud computing environment; communications systems used with, part of, or provided through, a cloud computing environment; or any other virtualized assets or sub-systems of "bare metal" physical devices such as mobile devices, remote sensors, laptops, desktops, point-of-sale devices, etc., located within a data center, within a cloud computing environment, or any other physical or logical location, as discussed herein, or as known/available in the art at the time of filing, or as developed/made available after the time of filing.

In various embodiments, any, or all, of the assets making up a given production environment discussed herein, or as known in the art at the time of filing, or as developed after the time of filing, can be implemented as one or more virtual assets.

In one embodiment, two or more assets, such as computing systems or virtual assets, two or more computing environments, are connected by one or more communications channels including but not limited to, Secure Sockets Layer communications channels and various other secure communications channels, or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, or virtual assets, as discussed herein, or available or known at the time of filing, or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, or computing systems, whether available or known at the time of filing or as later developed.

As used herein, the term "user" includes, but is not limited to, any party, parties, entity, or entities using, or otherwise interacting with any of the methods or systems discussed herein. For instance, in various embodiments, a user can be, but is not limited to, a person, a commercial entity, an application, a service, or a computing system.

As used herein, the term "relationship(s)" includes, but is not limited to, a logical, mathematical, statistical, or other association between one set or group of information, data, or users and another set or group of information, data, or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed training set labeling system determines a relationship between a first group of data and a second group of data, then a characteristic or subset of a first group of data can be related to, associated with, or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

Embodiments of the present disclosure address some of the shortcomings associated with user assistance programs and systems. A data management system in accordance with one or more embodiments provides effective assistance to users, while protecting sensitive data of the users. The various embodiments of the disclosure can be implemented to improve the technical fields of data processing, customer service, data management, data transmission, data analysis, and data collection. Therefore, the various described embodiments of the disclosure and their associated benefits amount to significantly more than an abstract idea.

Using the disclosed embodiments of a method and system for efficiently and securely providing assistance to users of a data management system, a method and system for efficiently and securely providing assistance to users of a data management system more effectively is provided. Therefore, the disclosed embodiments provide a technical solution to the long-standing technical problem of providing effective assistance to users of data management systems while protecting the sensitive data of the users.

The result is a much more accurate, adaptable, and robust method and system for efficiently and securely providing assistance to users of a data management system. This, in turn, results in: less human and processor resources being dedicated to assisting users because more accurate and efficient analysis methods can be implemented, i.e., less time required for analysis by humans, usage of fewer processing resources, usage of fewer memory storage assets, and less communication bandwidth being utilized to transmit data for analysis.

The disclosed method and system for efficiently and securely providing assistance to users of a data management system does not encompass, embody, or preclude other forms of innovation in the area of user assistance in data management systems. In addition, the disclosed method and system for efficiently and securely providing assistance to users of a data management system is not related to any fundamental economic practice, fundamental data processing practice, mental steps, or pen and paper-based solutions, and is, in fact, directed to providing solutions to new and existing problems associated with machine learning processes. Consequently, the disclosed method and system for efficiently and securely providing assistance to users of a data management system, does not encompass, and is not merely, an abstract idea or concept.

In the discussion above, certain aspects of one embodiment include process steps, operations, or instructions described herein for illustrative purposes in a particular order or grouping. However, the particular orders or groupings shown and discussed herein are illustrative only and not limiting. Those of skill in the art will recognize that other orders or groupings of the process steps, operations, and instructions are possible and, in some embodiments, one or more of the process steps, operations and instructions discussed above can be combined or deleted. In addition, portions of one or more of the process steps, operations, or instructions can be re-grouped as portions of one or more other of the process steps, operations, or instructions discussed herein. Consequently, the particular order or grouping of the process steps, operations, or instructions discussed herein do not limit the scope of the invention as claimed below.

As discussed in more detail above, using the above embodiments, with little or no modification or input, there is considerable flexibility, adaptability, and opportunity for customization to meet the specific needs of various parties under numerous circumstances.

In the discussion above, certain aspects of one embodiment include process steps, operations, or instructions described herein for illustrative purposes in a particular order or grouping. However, the particular order or grouping shown and discussed herein are illustrative only and not limiting. Those of skill in the art will recognize that other orders and groupings of the process steps, operations, or instructions are possible and, in some embodiments, one or more of the process steps, operations, or instructions discussed above can be combined or deleted. In addition, portions of one or more of the process steps, operations, or instructions can be re-grouped as portions of one or more other of the process steps, operations, or instructions discussed herein. Consequently, the particular order or grouping of the process steps, operations, or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or another device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for efficiently and securely providing assistance to users of a data management system, the method performed by one or more processors of the data management system and comprising:
    monitoring activity of a user accessing services of the data management system;
    retaining user data related to the user;
    detecting a trigger event based on the monitored activity, the trigger event predictive that the user will access a user assistance service of the data management system;
    generating a support case defining selected portions of the user data based on a type of the trigger event, the support case further defining conditions for withdrawing access to the selected portions of the user data;
    granting an assistance agent access to the selected portions of the user data;
    detecting at least one of the conditions for withdrawing access to the selected portions of the user data; and
    withdrawing the access to the selected portions of the user data in response to the detecting.

2. The method of claim 1, wherein the conditions define that access to the selected portions of the user data will be withdrawn after the support case is resolved.

3. The method of claim 1, wherein the conditions define that access to the selected portions of the user data will be withdrawn after a selected duration of time has elapsed.

4. The method of claim 1, further comprising:
    indicating, to the assistance agent, types of user data inaccessible by the assistance agent in relation to the generated support case.

5. The method of claim 4, further comprising:
    providing, to the assistance agent an option to request access to one or more of the indicated types of user data.

6. The method of claim 5, further comprising:
    retaining historical data indicating decisions made by supervising agents in response to previous access requests.

7. The method of claim 6, further comprising:
    training an analysis model with a machine learning process to identify whether a particular type of access request is likely to be approved based on the historical data associated with the particular type of access request.

8. The method of claim 7, further comprising:
    receiving, from the assistance agent, a request to access at least one of the inaccessible types of user data;
    analyzing the request using the analysis model; and
    granting or denying the request based on an output of the analysis model.

9. The method of claim 8, further comprising:
    passing the request to a supervising agent for approval or denial.

10. The method of claim 8, further comprising:
    generating, using the analysis model, a context score indicating whether the request should be granted based on at least one of an identity of the user, an identity of the assistance agent, the type of the trigger event, or a timing of the request;
    refraining from passing the request to a supervising agent; and
    automatically approving or denying the request, using the analysis model, based on the context score.

11. The method of claim 10, wherein the analysis model is trained using a supervised machine learning process.

12. The method of claim 10, wherein the analysis model is trained using an unsupervised machine learning process.

13. The method of claim 10, wherein the analysis model is trained based on at least one of a decision tree model a random forest model a logistic regression model, a latent Dirichlet allocation model, or a neural network model.

14. The method of claim 1, where the trigger event includes at least one of a failed attempt by the user to login to the data management system, a lockout of the user from accessing the data management system, or a failure of the data management system to perform an operation requested by the user.

15. The method of claim 1, wherein the support case further defines operations that the assistance agent is allowed to perform in assisting the user.

16. The method of claim 1, further comprising:
retrieving the support case from a support case blueprint database including a plurality of support case blueprints for assisting users of the data management system, each support case blueprint of the plurality of support case blueprints associated with a different type of trigger event.

17. The method of claim 1, wherein the user data includes at least one of a first name of the user, a surname of the user, a date of birth of the user, a user identifier, a government identification number, a driver's license number, a Social Security number, a phone number of the user, demographics data associated with the user, a type of user account, an address of the user, authentication data, data related to a bank account of the user, or data related to a credit card account of the user.

18. The method of claim 1, further comprising:
assigning the assistance agent to the support case prior to receiving an assistance request associated with the trigger event from the user.

19. A system for efficiently and securely providing assistance to users of a data management system, the system comprising:
one or more processors; and
at least one memory coupled to the one or more processors and storing instructions that, when executed by the one or more processors, cause the system to perform operations including:
monitoring activity of a user accessing services of the data management system;
retaining user data related to the user;
detecting a trigger event based on the monitored activity, the trigger event predictive that the user will access a user assistance service of the data management system;
generating a support case defining selected portions of the user data based on a type of the trigger event, the support case further defining conditions for withdrawing access to the selected portions of the user data;
granting an assistance agent access to the selected portions of the user data;
detecting at least one of the conditions for withdrawing access to the selected portions of the user data; and
withdrawing the access to the selected portions of the user data in response to the detecting.

20. The system of claim 19, wherein execution of the instructions causes the system to perform operations further including:
indicating, to the assistance agent, types of user data inaccessible by the assistance agent in relation to the generated support case.

21. The system of claim 20, wherein execution of the instructions causes the system to perform operations further including:
providing, to the assistance agent, an option to request access to one of the indicated types of user data.

22. The system of claim 21, wherein execution of the instructions causes the system to perform operations further including:
retaining historical data indicating decisions made by supervising agents in response to previous access requests.

23. The system of claim 22, wherein execution of the instructions causes the system to perform operations further including:
training an analysis model with a machine learning process to identify whether a particular type of access request is likely to be approved based on the historical data associated with the particular type of access request.

24. The system of claim 23, wherein execution of the instructions causes the system to perform operations further including:
receiving, from the assistance agent, a request to access at least one of the inaccessible types of user data;
analyzing the request using the analysis model; and
granting or denying the request based on an output of the analysis model.

25. The system of claim 24, wherein execution of the instructions causes the system to perform operations further including:
passing the request to a supervising agent for approval or denial.

26. The system of claim 24, wherein execution of the instructions causes the system to perform operations further including:
generating, using the analysis model, a context score indicating whether the request should be granted based on at least one of an identity of the user, an identity of the assistance agent, the type of the trigger event, or a timing of the request;
refraining from passing the request to a supervising agent; and
automatically approving or denying the request, using the analysis model, based on the context score.

27. The system of claim 26, wherein the analysis model is trained using a supervised machine learning process.

28. The system of claim 26, wherein the analysis model is trained using an unsupervised machine learning process.

29. The system of claim 26, wherein the analysis model is trained based on one of a decision tree model, a random forest model, a logistic regression model, a latent Dirichlet allocation model, or a neural network model.

30. The system of claim 19, wherein execution of the instructions causes the system to perform operations further including:
assigning the assistance agent to the support case prior to receiving an assistance request associated with the trigger event from the user.

* * * * *